(12) United States Patent
Chaney

(10) Patent No.: US 10,546,130 B1
(45) Date of Patent: Jan. 28, 2020

(54) TIMED ATTESTATION PROCESS

(71) Applicant: Government of the United States, as represented by the Secretary of the Air Force, Wright-Patterson AFB, OH (US)

(72) Inventor: Richard R Chaney, Tipp City, OH (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 211 days.

(21) Appl. No.: 15/441,675

(22) Filed: Feb. 24, 2017

(51) Int. Cl.
    *G06F 21/57* (2013.01)
    *G06F 16/2458* (2019.01)

(52) U.S. Cl.
    CPC .......... *G06F 21/57* (2013.01); *G06F 16/2477* (2019.01); *G06F 2221/034* (2013.01)

(58) Field of Classification Search
    CPC ....................................................... G06F 21/57
    USPC ......................................................... 726/23
    See application file for complete search history.

(56) References Cited

U.S. PATENT DOCUMENTS

| 7,840,763 B2 | 11/2010 | Murotake et al. |
| 2010/0333072 A1* | 12/2010 | Dulip ................. G06F 11/3419 717/128 |

FOREIGN PATENT DOCUMENTS

| WO | 2012123400 A1 | 9/2012 |
| WO | 2016181152 A1 | 11/2016 |

OTHER PUBLICATIONS

Reber, et al "Evaluating System on a Chip Design Security," Journal of Information Warfare, 16(3), pp. 63-78, Apr. 2017.
Yee et al. "Secure coprocessors in electronic commerce applications," USENIX Workshop on Electronic Commerce, 1995.
Reber; "A Comprehensive Security Analysis of and an Implementation Framework for Embedded Software Attestation Methods Leveraging FPGA-Based System-On-A-Chip Architectures," Graduate School of Engineering and Management, Air Force Institute of Technology; pp. 1-112, Mar. 2017.

(Continued)

*Primary Examiner* — Jacob Lipman
(74) *Attorney, Agent, or Firm* — AFMCLO/JAZ; Jeff Moore

(57) ABSTRACT

A Timed Attestation Process (TAP) utilizes a CPU bus cycle counter/timer to accurately measure the time needed to calculate a specific function value for an attestation query in an embedded system. The attestation query takes into account embedded software and the hardware data path. An attestation value database stores the unique timing and function data associated with each hardware design element in the embedded device, which each have unique timing characteristics. By utilizing the CPU bus cycle counter/timer of the client device, the TAP increases the time accuracy to the smallest tolerance possible relative to a particular CPU (typically +/−one instruction cycle). The integrity of the embedded software contained in the permanent storage elements and the hardware timing to access each component is verifiable against the unique timing characteristics stored in the database. With this timing characteristic, each hardware element is linked to a specific software configuration.

18 Claims, 4 Drawing Sheets

(56) References Cited

OTHER PUBLICATIONS

Seshardri, et all "SWATT: SoftWare-based ATTestation for Embedded Devices," Proceedings of the 2004 IEEE Symposium on Security and Privacy, pp. 1-11, May 12, 2004.
Steiner, et al. "Attestation in Wireless Sensor Networks: a Survey," ACM Computing Surveys, vol. V, No. N, Article A, Jan. 2015.
Trusted Computing Group. TPM main part 1—design principles, specification version 1.2, revision 94, Mar. 2006.
Tygar et al. "A system for using physically secure coprocessors," IP Workshop Proceedings, 1994.

* cited by examiner

FIG. 4

TIMED ATTESTATION PROCESS

GOVERNMENT INTEREST

The invention described herein may be manufactured and used by or for the Government of the United States for all governmental purposes without the payment of any royalty.

CROSS REFERENCE TO RELATED APPLICATIONS

Not applicable.

FIELD OF THE INVENTION

This invention relates to detection of system compromise (cyber-attacks) in embedded computer systems. More particularly, this invention relates to a Timed Attestation Process (TAP) for capturing time delays associated with specific function responses to attestation queries using CPU time-based registers.

BACKGROUND OF THE INVENTION

An embedded system is a computer system having a dedicated function within a larger mechanical or electrical system, often with real-time computing constraints. It is embedded as part of a complete device that may include hardware and mechanical parts. Embedded systems are found in many applications, including cell phones, home security systems, alarm systems, automated teller machines, automobiles, traffic lights, industrial control systems, medical equipment, and avionics. Due to the numerous critical uses of embedded systems, a method to detect instances of system compromise (cyber-attacks) is important.

Attestation is the process of validating the integrity of a computing device, such as a server needed for secure computing. One approach to detect a compromised device is software attestation. Generally, software attestation verifies that an initial application is still running unmodified on the untrusted device. Software attestation is a trust establishment mechanism in which a verifier system checks the integrity of the program memory content of a client system against unauthorized modification, such as what could occur by the insertion of malicious code. As opposed to hardware-based attestation, software attestation requires no additional hardware to verify untrusted computing systems. Software attestation is based on a challenge-response paradigm, between the verifier and the client. For example, the verifier may compare specific client data memory values to a known set of values, and if the values match, the client can be trusted. Because software attestation does not require physical access to the untrusted computing system, software attestation can verify the integrity of the application and/or code execution without special hardware.

One disadvantage of software attestation is that it validates only the client software, independent of the underlying hardware or additional CPU processing. In one scenario, an attacker could launch software exploits, such as return-oriented programming, to undermine software attestation. This could allow a compromised client, running on suspect hardware or running extra malicious code, to send an attestation response that the verifier accepts as valid.

What is needed, therefore, is a method to detect cyber-attacks in the software and hardware of embedded systems prior to their operational use. Knowing that a system has been compromised before a malicious attack manifests itself allows for mitigation before any real harm can be done.

SUMMARY OF THE INVENTION

The above and other needs are met by a Timed Attestation Process (TAP) that utilizes a CPU bus cycle counter/timer to accurately measure the time needed to calculate a specific function response value for an attestation query in an embedded system. Using the TAP approach, the attestation query takes into account embedded software along with the hardware data path. In preferred embodiments, a verifier device creates a database of values for timing and function data associated with one or more query responses. The database stores the unique timing and function data associated with each hardware design element in the embedded device, which may have unique timing characteristics for various function responses. For example, one function query may exercise the CPU to RAM, and another function query may exercise the CPU to Ethernet I/O controller. By utilizing the CPU bus cycle counter/timer of the client device, the TAP approach increases the timing accuracy to the smallest tolerance possible relative to a particular CPU (typically +/−one instruction cycle).

The integrity of the embedded software contained in the permanent storage elements (FLASH/ROM) and the hardware timing to access each component is verifiable against the unique timing characteristics stored in the database. By using these timing characteristics, each hardware element can be linked to a specific software configuration to verify integrity of the embedded system.

In preferred embodiments, timing data is collected for the challenge-response attestation process by the verifier device. This timing data includes the time needed for a query to be sent via a transport layer from the verifier device to the client device, the time needed for embedded client processing to generate a function response value, and the time needed for a response to be sent via the transport layer from the client device to the verifier device. The time needed for the client unit under test (UUT) to generate a function response value is measured using the client CPU bus cycle counter/timer. The client's function response value and the UUT elapsed time result as measured by the CPU bus cycle counter/timer are returned to the verifier device. The verifier device then compares the client's function response value, UUT elapsed time as measured by the CPU bus cycle counter/timer, and verifier elapsed time to the expected results. Leveraging the CPU bus cycle counter/timer of the client CPU increases the accuracy to +/−one instruction cycle on the client CPU, which for a CPU PowerPC TB cycle may be +/−60 nS. For comparison purposes, this represents a 1,000-fold improvement in timing accuracy over a typical Ethernet transport packet timing, which can vary by +/−100 uS A CPU instruction cycle is generally understood to be the process by which a computer retrieves a program instruction from its memory, determines what actions the instruction dictates, and carries out those actions. Some malicious attacks may cause the CPU to deviate and to execute instructions that are different from those intended. Alternatively or additionally, the attack may cause the CPU to deviate and interface with unintended devices, thereby increasing system vulnerability or resulting in an actual compromise. In either instance, the time required for the CPU to deviate from its intended task is reflected in the number of CPU instruction cycles measured by the CPU bus cycle counter/timer. A detected deviation as small as +/−one instruction cycle indicates unintended activity, which may have resulted from an attack.

Thus, by utilizing the CPU bus cycle counter/timer, the Timed Attestation Process accurately measures, to the smallest tolerance possible relative to a particular CPU—which is typically +/−one instruction cycle—the time to perform a specific function and to return a function response value for each attestation query. What is more, the TAP approach associates, through various function queries, unique timing values for each hardware design element, which are returned and compared to a known database. Integrity of the hardware and CPU processing for the data is assured because these relationships between timing values identify unique and repeatable processing characteristics for various function queries, provided that the integrity of the CPU is not compromised. No modified hardware or software processing can be inserted into an attestation client without detection because doing so will alter these characteristics.

Embodiments of the invention are directed to a system for performing a timed attestation process to validate the integrity of a Client Computing Device. In one preferred embodiment, the system includes a Verifier Computing device, a Client Computing Device, an Attestation Value Database, and a Transport Layer for providing communications between the Verifier Computing Device and the Client Computing Device.

The Verifier Computing Device is operable to:
upload an attestation image file to the Client Computing Device;
send a function query to the Client Computing Device;
receive a function result and a function elapsed time from the Client Computing Device;
determine a verifier elapsed time between sending the function query and receiving the function result;
compare the function result, function elapsed time and verifier elapsed time to corresponding baseline values stored in an Attestation Value Database; and
provide results of the comparison.

The Client Computing Device is operable to download the attestation image file from the Verifier Computing Device and execute the attestation image file to:
receive the function query;
process the function query using hardware elements of the Client Computing Device to generate the function result;
determine the function elapsed time in processing the function query; and
send the function result and the function elapsed time to the Verifier Computing Device.

The Attestation Value Database stores baseline values for function results, function elapsed times, and verifier elapsed times for multiple functions, which can vary by transport layer.

In some embodiments, the Verifier Computing Device comprises a customized dedicated computer, a desktop computer, a laptop computer, a tablet computer or a smart phone.

In some embodiments, the Client Computing Device or Client Device comprises an embedded computing device in an aircraft avionics system, an embedded computing device in a cell phone, an embedded computing device in a home security system, an embedded computing device in an alarm system, an embedded computing device in an automated teller machine, an embedded computing device in an automobile, an embedded computing device in a traffic light, an embedded computing device in an industrial control system, an embedded computing device in a piece of medical equipment, an embedded computing device in a transportation control system, an embedded computing device in a research and development system, an embedded computing device in a ground-based radar system, or an embedded computing device in a satellite system.

In some embodiments, the Transport Layer comprises an Ethernet network, a MIL-STD-01553 data bus, an RS-232 data bus, or an ARINC 429 data bus, a Wi-Fi network, a Bluetooth link, a Controller Area Network (CAN) bus, or a satellite communications network.

In some embodiments, the Attestation Value Database stores baseline values that were determined by:
(a) processing the function query multiple times on a first trusted Client Computing Device;
(b) collecting multiple function results, function elapsed times, and verifier elapsed times from the processing of step (a);
(c) analyzing the function results, function elapsed times, and verifier elapsed times collected in step (b) to determine a typical value and allowable variance for the function results, function elapsed times, and verifier elapsed times for the function query; and
(d) storing the typical values and allowable variances in the Attestation Value Database.

In some embodiments, the Attestation Value Database stores baseline values determined by repeating steps (a) through (d) based on execution of the function query multiple times on a second trusted Client Computing Device of the same type or configuration as the first Client Computing Device.

In some embodiments, the results of the comparison provided by the Verifier Computing Device include comparison results listed in an output file or comparison results displayed on a display device or both.

In some embodiments, the Verifier Computing Device sends the function query to the Client Computing Device via the Transport Layer and receives the function result and the function elapsed time from the Client Computing Device via the Transport Layer.

In another aspect, the invention provides a timed attestation process for validating the integrity of a Client Computing Device. In a preferred embodiment, the process includes:
(a) establishing communications between the Client Computing Device and a Verifier Computing Device via a Transport Layer;
(b) sending an attestation image file to the Client Computing Device;
(c) booting the Client Computing Device using the attestation image file;
(d) sending a function query from the Verifier Computing Device to the Client Computing Device;
(e) by execution of the attestation image file, processing the function query to generate a function result using hardware elements of the Client Computing Device;
(f) determining the function elapsed time in performing step (e);
(g) sending the function result and the function elapsed time to the Verifier Computing Device;
(h) receiving the function result and the function elapsed time at the Verifier Computing Device;
(i) determining the verifier elapsed time between step (d) and step (h);
(j) comparing one or more of the function result, the function elapsed time and the verifier elapsed time to corresponding baseline values stored in an Attestation Value Database; and (k) providing the results of step (j) to indicate a level of integrity of the Client Computing Device.

In some embodiments, the timed attestation process includes the following steps performed prior to step (j):

(l) processing the function query multiple times on a first trusted Client Computing Device;

(m) collecting multiple function results, function elapsed times, and verifier elapsed times from the processing of step (l);

(n) analyzing the function results, function elapsed times, and verifier elapsed times collected in step (m) to determine typical values and allowable variances for the function results, function elapsed times, and verifier elapsed times for the function query; and (o) storing the typical values and allowable variances in the Attestation Value Database.

In some embodiments, the timed attestation process includes repeating steps (l) through (o) based on execution of the function query multiple times on a second trusted Client Computing Device of the same type as the first Client Computing Device.

In some embodiments, the results of the comparison of step (j) include outputting a list of comparison results in an output file or outputting comparison results to a display device or both.

In yet another aspect, embodiments of the invention provide a Verifier Computing Device for performing a timed attestation process to validate the integrity of a Client Computing Device. In one preferred embodiment, the Verifier Computing Device includes a memory device, a processor, an I/O device, and a display device for displaying attestation results. The memory device stores an attestation image file that includes instructions to be executed by the Client Computing device for:

receiving a function query at the Client Computing Device;

processing the function query using hardware elements of the Client Computing Device to generate a function result;

determining a function elapsed time in processing the function query; and sending the function result and the function elapsed time to the Verifier Computing Device.

The processor of the Verifier Computing Device executes instructions to:

upload the attestation image file to the Client Computing Device;

send the function query to the Client Computing Device;

receive the function result and the function elapsed time from the Client Computing Device;

determine a verifier elapsed time between sending the function query and receiving the function result; and compare the function result, function elapsed time and verifier elapsed time to corresponding baseline values stored in an Attestation Value Database.

The input/output device provides communication with the Client Computing Device via a Transport Layer to:

upload the attestation image file to the Client Computing Device;

send the function query to the Client Computing Device; and receive the function result and the function elapsed time from the Client Computing Device.

BRIEF DESCRIPTION OF THE DRAWINGS

Other embodiments of the invention will become apparent by reference to the detailed description in conjunction with the figures, wherein elements are not to scale so as to more clearly show the details, wherein like reference numbers indicate like elements throughout the several views, and wherein:

FIG. 4 depicts a display of comparison results on a display device generated by a Timed Attestation Process according to a preferred embodiment.

DETAILED DESCRIPTION OF THE INVENTION

Figure 1:
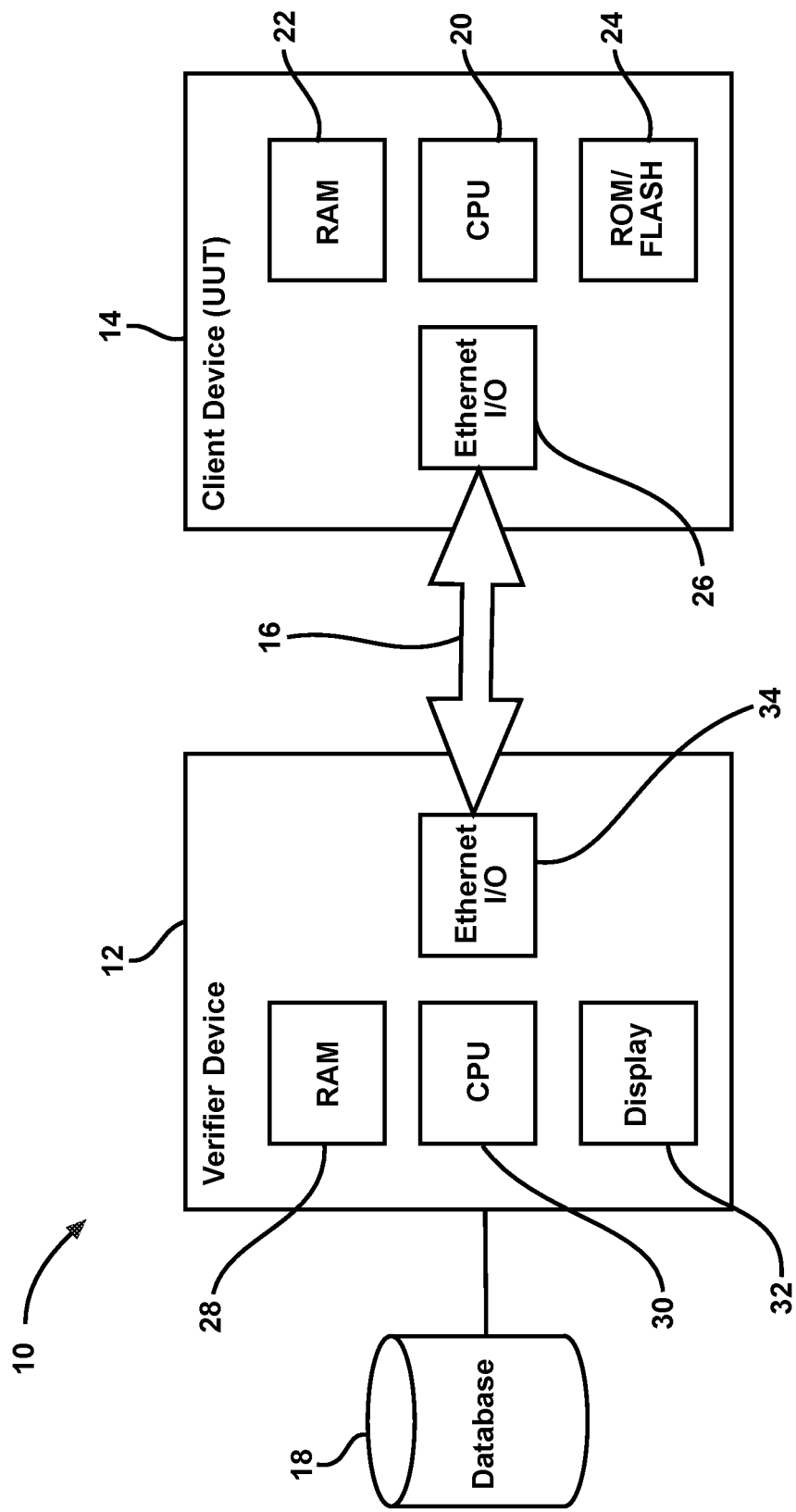
FIG. 1 depicts a system for performing a Timed Attestation Process according to a preferred embodiment.

Depicted in FIG. 1 is a system 10 for performing a Timed Attestation Process (TAP) according to a preferred embodiment. The exemplary system 10 includes a verifier device 12 in communication with a client device 14 via a transport layer 16. The verifier device 12 may be a personal computer, such as a laptop computer, desktop computer, or tablet computer. Alternatively, the verifier device 12 may be a customized computer configured to be dedicated to the performance of the TAP on various client devices. The client device 14, also referred to herein as the unit under test (UUT), may be an embedded computing device, such as may be employed in an avionics line replaceable unit (LRU) used for aircraft navigation. In other exemplary and non-limiting embodiments, the client device 14 may be an embedded computing device in a cell phone, home security system, alarm system, automated teller machine, automobile, traffic light, industrial control system, piece of medical equipment, ground based radar system, or satellite system. In one embodiment, the transport layer 16 is an Ethernet network. In some embodiments, the transport layer 16 comprises a communication network. In some embodiments, the transport layer 16 may comprise a MIL-STD-01553 data bus, an RS-232 data bus, an ARINC 429 data bus, a Wi-Fi network, a Bluetooth link, a Controller Area Network (CAN) bus, or a satellite communications network.

In a preferred embodiment, the verifier device 12 includes a central processing unit (CPU) 30, random access memory (RAM) 28, an Ethernet I/O controller 34, and a display device 32.

In a preferred embodiment, the client device 14 includes a CPU 20 such as a PowerPC type CPU, RAM 22, read-only memory (ROM) 24, and an Ethernet I/O controller 26.

The verifier device 12 is also in communication with an attestation value database 18 that stores baseline values for function results, function elapsed times, and verifier elapsed times for multiple functions that may be performed by various combinations of hardware elements of the client device 14.

The baseline values for function results and elapsed times stored in the attestation value database 18 can be determined based on the collected function results from multiple executions of each function on a client device that is in a known good state (i.e., trusted). These initial executions create a set of baseline values designated as default values for all client devices of the same type or configuration. For each function, the baseline values include the function result, the function elapsed time, and the verifier elapsed time. An exemplary set of baseline values are described hereinafter.

The collected baseline values are analyzed to produce typical values and allowable variances for each function result, for each function elapsed time, and for each verifier elapsed time. In one preferred embodiment, the typical values and allowable variances are captured in an ASCI text file and are stored in HTML format in the attestation value database 18.

Baseline values in the database 18 may be updated when another trusted client device is tested that is of the same type or configuration as the one used to create the initial default values. In a preferred embodiment, a new database entry is created to identify the new device, and the collected results for the new device are automatically re-analyzed to produce a unique set of typical values and allowable variances for each function result, function elapsed time, and verifier elapsed time.

Figure 2:
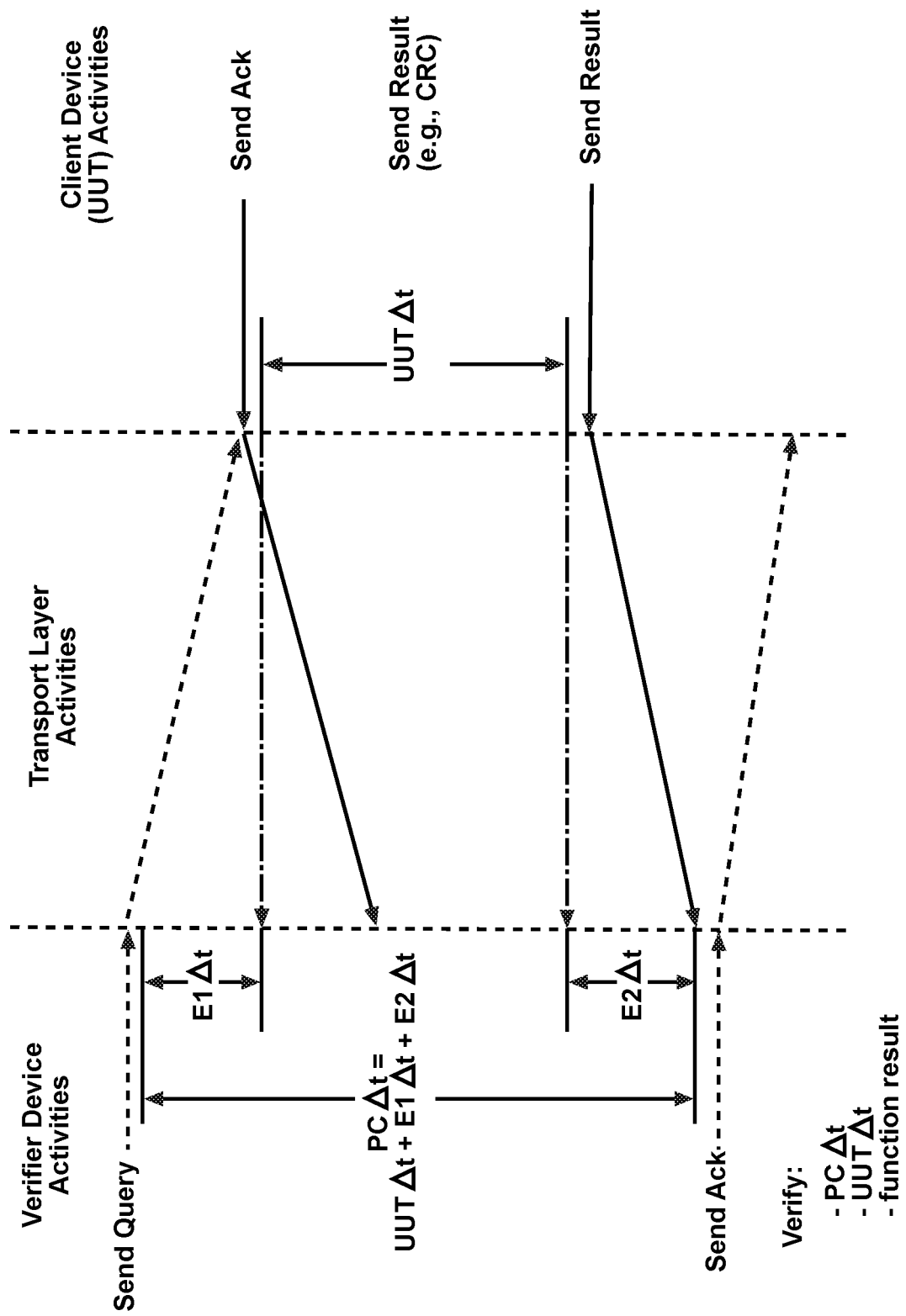
FIG. 2 depicts various timing relationships for a Timed Attestation Process according to a preferred embodiment.
Figure 3:
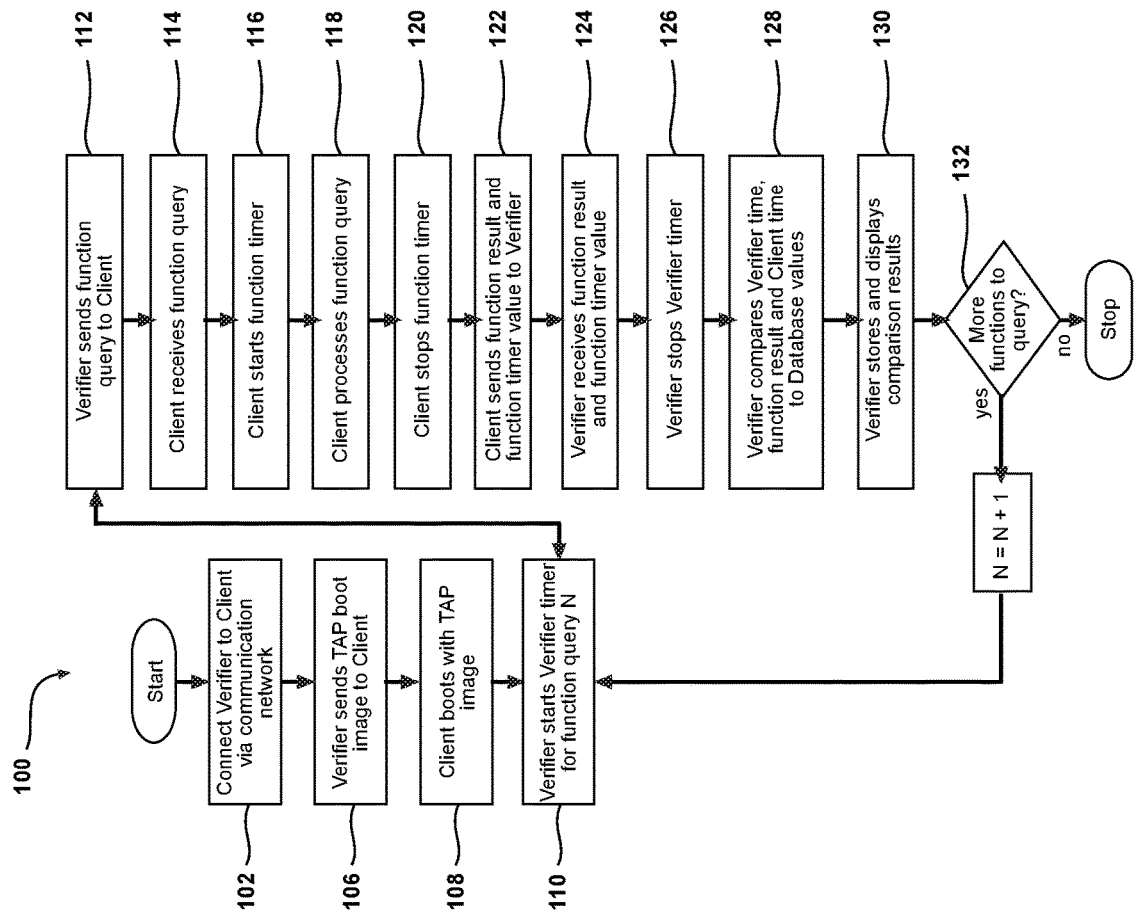
FIG. 3 depicts steps of a method for performing a Timed Attestation Process according to a preferred embodiment.

FIGS. 2 and 3 depict an embodiment of a method for performing the Timed Attestation Process (TAP) using the system shown in FIG. 1. It will be appreciated that because the client device 14 is in an untrusted state, it must be transitioned to a state where the results of the Timed Attestation Process will be indicative of whether or not the integrity of the client device 14 has been compromised. According to one aspect of the invention, once transitioned, the client device 14 can be queried and various timing characteristics of the client device 14 when subjected to these queries, as they are executed by the client device 14, can be used to determine its level of integrity. Additional timing characteristics of the verifier device 12 can be used to complete that integrity assessment, increase confidence in that assessment, or to improve that assessment. Responses to the aforementioned queries can similarly be used.

In the exemplary embodiment, client device 14 is transitioned using a TAP boot image file, also referred to herein as an attestation image file, provided by verifier device 12. Once the verifier device 12 has been connected to the client device 14 via the transport layer 16 (step 102) and the Client Device 14 has been powered on, the verifier device 12 uploads the attestation image file from the RAM 28 of the verifier device 12 to the client device 14 (step 106). The attestation image file contains the executable functions to operate the Timed Attestation Process on Client Device 14, such as the receive function, start/stop timer function, process function, and send result function (steps 114-122 in FIG. 3), each of which is discussed in more detail hereinafter. Because the client device 14 is suspect and not trusted, such as would occur by the unknown installation of malicious code, the TAP program is executed from the attestation image file when the client device 16 boots (step 108). The act of booting from a known good image file eliminates the possibility of an attacker defeating the TAP process by inserting code to fool or mimic the TAP process. For instance, since the client device 14 is suspect, any executable code currently on the device is also suspect. The act of booting from the attestation image file eliminates the use of suspect code. Thus, in the exemplary embodiment, the use of the attestation image file facilitates consistent timing responses.

As described in more detail hereinafter, verifier and/or client timing data is collected for the attestation process using a CPU bus cycle counter/timer in both the verifier 12 and client devices 14. Hardware embodiments of the CPU bus cycle counter/timer can include the TB TimeBase Counter (which may include a Time Base Upper and Time Base Lower) registers used in the PowerPC CPU and the Time Stamp Counter (TSC) used in the Intel x86 CPU. The CPU bus cycle counter/timer could also be implemented using software-based CPU external timing devices having software functions for recording CPU cycles.

The verifier elapsed time (PC $\Delta$t) includes the time needed for the client CPU 20 to perform a specified function (UUT $\Delta$t) and the communication protocol time delays (E1 $\Delta$t and E2 $\Delta$t) associated with the transport layer 16. Thus, the verifier time is calculated as:

$$PC\Delta t = UUT\Delta t + E1\ \Delta t + E2\ \Delta t.$$

In the preferred embodiment, the client processing time (UUT $\Delta$t) is determined by the CPU bus cycle counter/timer based on CPU time-based registers in the CPU 20. These registers indicate the number of CPU Bus Clock cycles (bus cycles) to which CPU instructions are directly related. For example, a 32-bit divide CPU instruction requires 19 bus cycles to execute, while other CPU instructions may require only four bus cycles. In the preferred embodiment, the CPU 20 uses the CPU bus cycle counter/timer and records Start and End values of the CPU time-based registers during the calculation of the function. Based on the Start and End values, the UUT $\Delta$t can be determined. This value is then returned to the verifier device along with the function result.

It will be appreciated that the communication protocol delays E1 $\Delta$t and E2$\Delta$t associated with a particular type of transport layer (Ethernet, MIL-STD-01553, RS-232, ARINC 429, a Wi-Fi, Bluetooth, CAN) will be different from the communication protocol delays associated with other types of transport layers. In a preferred embodiment, the expected values for E1$\Delta$t and E2$\Delta$t for various types of transport layers have been measured and stored in the database 18, and are available for PC $\Delta$t verification purposes. Although using a different transport layer will result in the same UUT $\Delta$t for a given function, the PC $\Delta$t (which includes E1 $\Delta$t and E2 $\Delta$t) allows for a level of trust or validates the UUT $\Delta$t.

The challenge-response attestation process begins with starting the verifier timer to measure PC $\Delta$t (step 110) and sending a function query via the transport layer 16 to the client device 14 (step 112). In preferred embodiments, the verifier timer is a CPU bus cycle counter/timer associated with the CPU 30 of the verifier device 12, which functions in generally the same manner as the CPU bus cycle counter/timer associated with the CPU 20 of the client device 14.

In the example depicted in FIG. 2, the function query is a Cyclic Redundancy Check (CRC) over a particular memory range in the RAM 22. Examples of other function queries include AND, OR, ADD and READ functions. In the various types of function queries, the CPU 20 interfaces with different chips, such as memory (RAM 22, ROM/FLASH 24) and I/O chips 26 (Ethernet, 1553, 429, CAN, etc.). The data read from these chips in response to a function query can be reduced to single result (such as 32, 64, or 12 bits). The process to reduce this data can be a mathematical function, logical function, or a combination of both. Examples of mathematical functions include add, multiply, divide, and subtract. Examples of logical function include AND, OR, and XOR. The exemplary CRC function utilizes both mathematical and logical functions.

Figure 4:
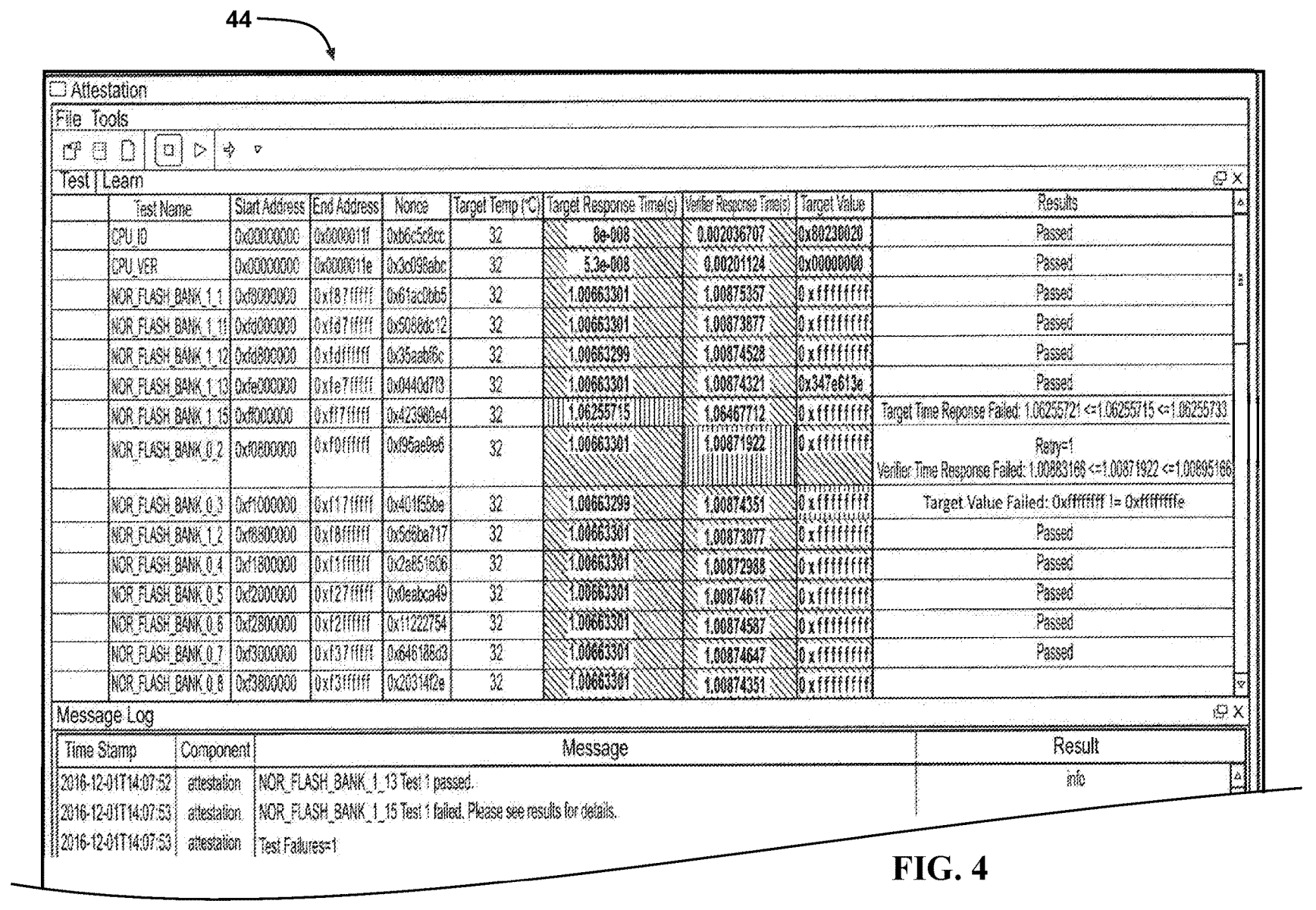

The time required to respond to a function query using its associated chip over a specific range of data is unique to that function and chip. For example, the time required for client CPU 20 to execute an AND function on the ROM chip 24 from address 0x10 to address 0x20 is a unique value, as compared to other combinations of functions and chips. FIG. 4 lists examples of other function queries, including CPU ID and CPU VER.

Upon receipt of the function query (step 114), the client device 14 starts the CPU bus cycle counter/timer (step 116). In the exemplary embodiment wherein the function query is a CRC function, the CPU 20 of the client device 14 performs the requested CRC function (step 118) and stops the CPU bus cycle counter/timer upon completion (step 120). In a preferred embodiment, the CPU bus cycle counter/timer value (UUT Δt), also known as the function elapsed time, is the difference between the values of the CPU time-based registers at timer start and timer stop. The minimum number of CPU bus cycles for a single instruction is one cycle. Therefore, when a function elapsed time is calculated based on the values of the CPU time-based registers at timer start and timer stop, the function elapsed time is generally accurate to within plus or minus one CPU instruction cycle.

The returned CRC function value and the function elapsed time value are sent to the verifier device 12 via the transport layer 16 (step 122). Upon receipt of the CRC function value and the function timer value (step 124), the verifier device 12 stops the verifier timer and stores the verifier timer value (PC Δt) (step 126), which is also known as the verifier elapsed time.

As shown in FIG. 2, there are time delays in the Verifier Device Activities portion of the timing diagram between the Send Query and the beginning of E1 Δt and between the end of E2 Δt and the Send Acknowledgment. There are also time delays in the Client Device Activities portion of the timing diagram between the Send Acknowledgment and the beginning of UUT Δt and between the end of UUT Δt and the Send Result. These time delays indicate that the time capture periods for PC Δt and UUT Δt are slightly offset in time from the transport layer "Send" functions.

In the exemplary embodiment, the verifier device 12 analyzes the results of the TAP by comparing (1) the CRC function value, (2) the function timer value (UUT Δt), and (3) the verifier timer value (PC Δt) to acceptable baseline values corresponding to these three data values as stored in the database 18 for a CRC function query of the RAM 22 of the client device 14 (step 128). In a preferred embodiment, the comparison results are written to an output file and displayed on the display device 32 associated with the verifier device 12 (step 130). The tested function (hardware/software) of the client device 14 is determined to be compromised (untrusted) if any one or more of the following conditions are true:
(1) The returned function value does not correspond to the value stored in the database 18, such as by matching it. This is indicative of memory or device corruption.
(2) The returned function timer value (UUT Δt) is not within +/−1.0 CPU instruction cycle time, or some other predetermined acceptable range, of the corresponding baseline value stored in the database 18. This is indicative of an attack compromise at the board level of the client device.
(3) The returned verifier timer value (PC Δt) is not within an acceptable variance of the corresponding baseline value stored in the database 18. This is indicative of an attack compromise at the transport layer level. The determination of an acceptable variance for PC Δt can depend on the type of transport layer involved.

Referred to as the Target Response Time in FIG. 4, the Target Response Time may be the instruction cycle expected for a given test or in one embodiment a sequence of tests. Typically, a computing device may process thousands of Instruction Cycles per second. In one embodiment the Target Response Times are established by prior testing of the specific test and the Client Device CPU 20, in one embodiment they are established using the Client Device CPU bus cycle counter/timer (internal timer). In one embodiment the Target Response Time is based upon a plurality of prior Client Device test results. In one embodiment, +/−5 instruction cycles or +/−about 1 to about 20 instruction cycles. Where the Target Response time is established using the Client Device 14 CPU 20 internal timer, the Target Response Time range may be +/−1 instruction cycle. Alternatively, in one embodiment the Target Response Time may be between +/−about 20 and about 500 instruction cycles, or +/−about 50 and about 1500 instruction cycles where the Test Response Time is not device specific or where a new device without prior history is being compared to the historical test results of similar devices.

In one preferred embodiment, the comparison results output file is an ASCII text file in which each function query is represented on a separate line, and each line contains the following values:
Test #
Date (yyyy-mm-dd) and Time (hh:mm:ss)
Test Name
Start Address
End Address
NONCE
Client device temperature
Returned function timer value
Returned verifier timer value
Returned function value
Result of comparison (Passed, Failed), If Failed then (Min Variance<=result<=Max Variance)

It will be appreciated that a nonce is an arbitrary number that may only be used once and is similar to a nonce word in cryptography. It may be a random or pseudo-random number issued in an authentication protocol to ensure that old communications cannot be reused in replay attacks.

FIG. 4 depicts an embodiment of a display screen showing exemplary comparison Attestation Results 44. In the embodiment depicted in FIG. 4, green shading (represented by the diagonal crosshatching) in the cells of the Target Response Time, Verifier Response Time, and Target Value columns provides a prominent visual indication that the values passed the comparison tests, while red shading (represented by the vertical crosshatching) indicates a fail condition. In one embodiment the "Test Name" or function query column in FIG. 4 illustrates a collection of tests being performed. The test may be general or client device 14 specific. The test may be specific to one or more components of the client device including the CPU 20, ROM 24, RAM 22, Ethernet 26 or combinations thereof, illustrated in FIG. 1. The function query may be any desired query or sequence of instructions. In one embodiment the function query may be a Cyclic Redundancy Check.

In one embodiment the "Start Address" column in FIG. 4 illustrates where in the computational process the test begins, the "End Address" illustrates where in the computational process the test ends. In one embodiment a cryptographic nonce or "Nonce" may be used to ensure that prior communications are not being "replayed" to hide malware or counterfeit components. In one embodiment and target temperature for running the test may be specific to assist in process repeatability as illustrated in FIG. 4.

The "Target Response Times" illustrated in FIG. 4 are an illustration of corresponding baseline values, each of which may be compiled into an attestation value database of acceptable test results. FIG. 4 illustrates the baseline values as Target Response Times in seconds and very small fractions thereof.

The Client Device may have multiple data paths. The data paths may be specific to the Client Device CPU 20. There may be a Test for each data path or a plurality of data paths. Each data path tested may have a unique Target Response Time.

In one embodiment the Target Response Time range is determined by a plurality of other Client Device test results. Prior testing of the Client Device CPU may deliver the Target Response Time range based upon past performance. The instruction cycle may be encompass a collection of tests being performed. The test(s) may be general or Client Device 14 specific. The test may be specific to one or more components of the client device including the CPU 20, ROM 24, RAM 22, Ethernet 26 or combinations thereof, illustrated in FIG. 1.

Each test results in a verifier elapsed time illustrated as a Verifier Response Time in FIG. 4. An acceptable Client Device 14 will have and Verified Response Time within the acceptable Target Response Time Range identified above in order to pass the Test (PC $\Delta t$).

The "Target Value" illustrated in FIG. 4 is the returned function value discussed above. In one embodiment the "message Log" of FIG. 4 provides a text summary (message) of test results. As should in FIG. 4 the results may be Time Stamp sequential or In one embodiment sorted by pass/fail or other criteria as programmed.

The results of comparison may be color coded as indicated by hashed lines in FIG. 4, textual results, or a combination thereof as also shown in FIG. 4.

In preferred embodiments, several functions of various hardware interfaces in the client device are queried by repeating steps 110 through 130 for each function/interface. For example, the following functions may be queried for the following hardware interfaces:

chip ID, uBoot runtime, and attestation runtime of a RAM interface;

chip ID, uBoot binary, and application binary of a ROM/FLASH interface; and chip ID, Mac ID, and configuration registers of an Ethernet I/O interface.

In the embodiment described above, the client device 14 is an embedded computing device in an avionics module. It should be appreciated that in other embodiments the client device 14 may be an embedded computing device in a factory industrial control system (ICS) or other manufacturing application, in a transportation application, in a research and development application, in a ground based radar application, or in a satellite system application. For example, power plant controllers could be verified daily, self-driving cars could be verified by their owners, and robot production lines could be verified on regular maintenance intervals.

The foregoing description of preferred embodiments for this invention have been presented for purposes of illustration and description. They are not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A system for performing a timed attestation process to validate the integrity of a Client Computing Device, the system comprising:

a Verifier Computing Device operable to:

detect a Client Computing Device boot and upload an attestation image file to the Client Computing Device;

send one or more of a function query to the Client Computing Device;

receive one or more of a function result and one or more a function elapsed time from the Client Computing Device;

determine one or more of a verifier elapsed time between sending the function query and receiving the function result;

compare the one or more of the function result, function elapsed time and verifier elapsed time to corresponding baseline values; and provide results of the comparison;

the Client Computing Device operable to download the attestation image file during the Client Computing Device boot from the Verifier Computing Device and boot the attestation image file to:

only execute the attestation image file;

receive the function query;

process the function query using hardware elements of the Client Computing Device to generate the function result;

determine the function elapsed time in processing the function query; and send the function result and the function elapsed time to the Verifier Computing Device;

a Transport Layer for providing communications between the Verifier Computing Device and the Client Computing Device; and an Attestation Value Database for storing the baseline values for the one or more of the function results, function elapsed times, and verifier elapsed times; wherein the Attestation Value Database is used by the Verifier Computing Device to form an embedded system to verify the integrity of the Client Computing Device.

2. The system of claim 1 wherein the Transport Layer comprises an Ethernet network, a MIL-STD-01553 data bus, an RS-232 data bus, or an ARINC 429 data bus, a Wi-Fi network, a Bluetooth link, a Controller Area Network (CAN) bus, or a satellite communications network.

3. The system of claim 1 wherein the Verifier Computing Device sends the function query to the Client Computing Device via the Transport Layer and receives the function result and the function elapsed time from the Client Computing Device via the Transport Layer.

4. The system of claim 1 wherein the Client Computing Device hardware interfaces may include chip ID, uBoot runtime, attestation runtime of a RAM interface, embedded software, and application binary of a ROM/FLASH interface; and configuration registers of an Ethernet I/O interface.

5. The system of claim 1 wherein the Client Computing Device hardware interfaces may include chip ID, uBoot runtime, attestation runtime of a RAM interface, embedded software, application binary of a ROM/FLASH interface; and configuration registers of an Ethernet I/O interface.

6. The system of claim 1 wherein the Client Computing Device includes a dedicated computer having the ability to detect the Verifier Computer Device and then download the attestation image file and only executing the attestation image file, prior to boot and not a Client Computing Device suspect executable code contained in the Client Computing Device hardware permanent storage elements.

7. The system of claim 1 wherein the Client Computing Device hardware elements may include chip ID, uBoot runtime, attestation runtime of a RAM interface, embedded software, application binary of a ROM/FLASH interface; and configuration registers of an Ethernet I/O interface.

8. The system of claim 7 wherein the function result includes a Client Computing Device hardware interface interrogation result, used by the Verifier Computing Device to form an embedded system to verify the integrity of the Client Computing Device.

9. The system of claim 1 wherein the Attestation Value Database stores baseline values determined by:
   (a) processing the function query multiple times on a first trusted Client Computing Device;
   (b) collecting multiple function results, function elapsed times, and verifier elapsed times from the processing of step (a);
   (c) analyzing the function results, function elapsed times, and verifier elapsed times collected in step (b) to determine a typical value and allowable variance for the function results, function elapsed times, and verifier elapsed times for the function query; and
   (d) storing the typical values and allowable variances in the Attestation Value Database.

10. The system of claim 9 wherein the Attestation Value Database stores baseline values determined by repeating steps (a) through (d) based on execution of the function query multiple times on a second trusted Client Computing Device of the same type as the first Client Computing Device.

11. A timed attestation process for validating the integrity of a Client Computing Device, the process comprising:
   (a) during boot and prior to executing a suspect code the Client Computing Device detects a Verifier Computing Device and establishes communications via a Transport Layer;
   (b) sending an attestation image file to the Client Computing Device;
   (c) booting the Client Computing Device using the attestation image file;
   (d) sending a function query from the Verifier Computing Device to the Client Computing Device;
   (e) processing the function query by execution of the attestation image file to generate a function result using hardware elements of the Client Computing Device; the function results comprising an interrogation result of the Client Computing Device hardware interfaces of an embedded software contained in a Client Computing Device permanent storage element the permanent storage element including ROM/Flash, chip ID, Mac ID, and configuration registers;
   (f) determining the function elapsed time in performing step (e);
   (g) by execution of the attestation image file, sending the function result and the function elapsed time to the Verifier Computing Device;
   (h) receiving the function result and the function elapsed time at the Verifier Computing Device;
   (i) determining the verifier elapsed time between step (d) and step (h);
   (j) comparing one or more of the function result, the function elapsed time and the verifier elapsed time to corresponding baseline values stored in an Attestation Value Database; and
   (k) providing the results of step (j) to indicate a level of integrity of the Client Computing Device.

12. The system of claim 11 wherein the Client Computing Device is an embedded computer with a hardware interface that include a chip ID, a uBoot runtime, an attestation runtime of a RAM interface, a ROM/FLASH interface; and a plurality of configuration registers having an Ethernet I/O interface; the Client Computing Device further comprising any of an embedded computing device in an aircraft avionics system, an embedded computing device in a cell phone, an embedded computing device in a home security system, an embedded computing device in an alarm system, an embedded computing device in an automated teller machine, an embedded computing device in an automobile, an embedded computing device in a traffic light, an embedded computing device in an industrial control system, an embedded computing device in a piece of medical equipment, an embedded computing device in a transportation control system, an embedded computing device in a research and development system, an embedded computing device in a ground based radar system, and an embedded computing device in a satellite system.

13. The timed attestation process of claim 11 wherein the Transport Layer comprises an Ethernet network, a MIL-STD-01553 data bus, an RS-232 data bus, an ARINC 429 data bus, a Wi-Fi network, a Bluetooth link, a Controller Area Network (CAN) bus, or a satellite communications network.

14. The timed attestation process of claim 11 wherein step (b) comprises the Verifier Computing Device sending the attestation image file to the Client Computing Device via the Transport Layer.

15. The timed attestation process of claim 11 further comprising the following steps performed prior to step (j):
   (l) processing the function query multiple times on a first trusted Client Computing Device;
   (m) collecting multiple function results, function elapsed times, and verifier elapsed times from the processing of step (l);
   (n) analyzing the function results, function elapsed times, and verifier elapsed times collected in step (m) to determine a typical value and allowable variance for the function results, function elapsed times, and verifier elapsed times for the function query; and
   (o) storing the typical values and allowable variances in the Attestation Value Database.

16. The timed attestation process of claim 15 further comprising repeating steps (l) through (o) based on execution of the function query multiple times on a second trusted Client Computing Device of the same type as the first Client Computing Device.

17. A Verifier Computing Device for performing a timed attestation process to validate the integrity of a Client Computing Device, the Verifier Computing Device comprising:
   a memory device that stores an attestation image file, the attestation image file comprising instructions to be executed by the Client Computing device for:
      only execute the attestation image file;
      receiving a function query at the Client Computing Device;
      processing the function query using hardware elements of the Client Computing Device to generate a function result;
      determining a function elapsed time in processing the function query; and sending the function result and the function elapsed time to the Verifier Computing Device;
a processor operable to execute instructions to:
  detect a Client Computing Device boot and;
  upload the attestation image file to the Client Computing Device;
  send the function query to the Client Computing Device;
  receive the function result and the function elapsed time from the Client Computing Device;
  determine a verifier elapsed time between sending the function query and receiving the function result; and
  compare the function result, function elapsed time and verifier elapsed time to corresponding baseline values stored in an Attestation Value Database;
a display device for displaying comparison results; and
an input/output device for providing communication with the Client Computing Device via a Transport Layer to:
  upload the attestation image file to the Client Computing Device;
  send the function query to the Client Computing Device; and
  receive the function result and the function elapsed time from the Client Computing Device.

18. The Verifier Computing Device of claim 17 wherein input/output device is operable to provide communication with the Client Computing Device via an Ethernet network, a MIL-STD-01553 data bus, an RS-232 data bus, an ARINC 429 data bus, a Wi-Fi network, a Bluetooth link, a Controller Area Network (CAN) bus, or a satellite communications network.

* * * * *